INVENTOR
KENNETH HUBERT CLAYSON
BY Young & Thompson
ATTORNEYS

United States Patent

[11] 3,603,810

[72] Inventor Kenneth Hubert Clayson
Solihull, England
[21] Appl. No. 756,939
[22] Filed Sept. 3, 1968
[45] Patented Sept. 7, 1971
[73] Assignee Wilmot-Breeden Limited

[54] SEQUENCE CONTROL CIRCUITS
1 Claim, 5 Drawing Figs.

[52] U.S. Cl. .......... 307/232, 307/223, 307/269, 328/75
[51] Int. Cl. .......... H03k 5/20
[50] Field of Search .......... 307/220, 221, 231, 223, 224, 241, 232, 253, 269; 328/43, 62, 70, 72, 75, 130

[56] References Cited

UNITED STATES PATENTS

| | | | |
|---|---|---|---|
| 2,888,556 | 5/1959 | Richards .......... | 328/43 |
| 3,051,855 | 8/1962 | Lee .......... | 328/43 X |
| 3,113,273 | 12/1963 | Tendick, Jr. .......... | 328/75 X |
| 3,181,006 | 4/1965 | Melhus .......... | 328/43 X |
| 3,275,848 | 9/1966 | Bell .......... | 307/289 |

*Primary Examiner*—Donald D. Forrer
*Assistant Examiner*—John Zazworsky
*Attorney*—Young & Thompson

ABSTRACT: A circuit having a plurality of adding or "AND" circuit stages and a corresponding number of bistable state or "LATCH" circuit stages connected alternately in sequence to provide associated pairs. Each "LATCH" stage has in use a normal state in which it is inoperative and a triggered state in which an output connection of that stage provides one of a sequence of output signals, one input for the associated "AND" stage, and a changeover signal for an immediately adjacent "LATCH" stage. Additional inputs for the "AND" stages are provided from a connection or connections to which external control signals can be applied, and the application of two inputs to one of the "AND" stages produces an output thereof which acts to change over a corresponding one of the "LATCH" stages.

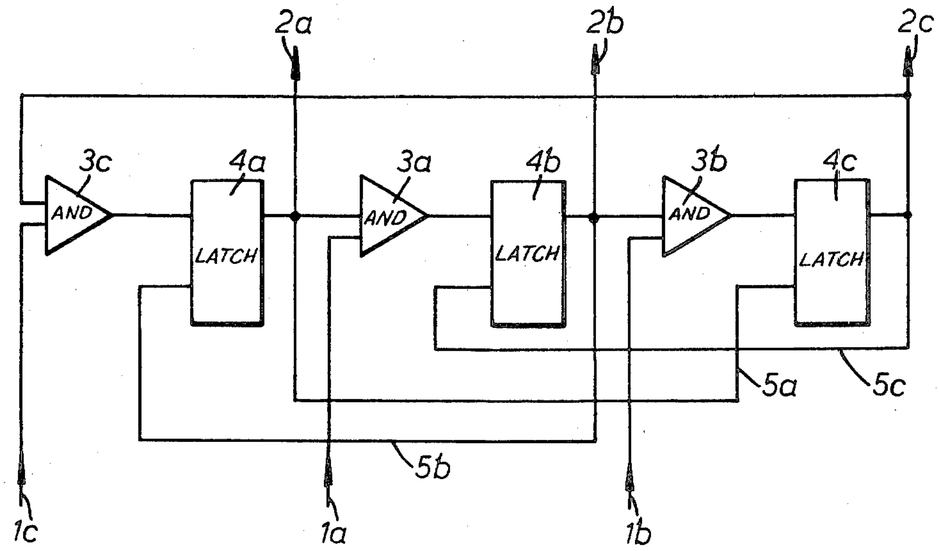

INVENTOR
KENNETH HUBERT CLAYSON
BY
Young + Thompson
ATTORNEYS

INVENTOR
KENNETH HUBERT CLAYSON
BY
Young + Thompson
ATTORNEYS

INVENTOR
KENNETH HUBERT CLAYSON
BY Young & Thompson
ATTORNEYS

SEQUENCE CONTROL CIRCUITS

This invention relates to sequence control circuits which in use provide output signals in sequence at a plurality of output connections. It is concerned with such circuits of this nature which are subject to external control, i.e. are not free running, sequencing of the output signals resulting from the application of a succession of external input control signals.

The object of the invention is to provide improved circuit arrangements which are particularly usefully employed in automatic machine control. Circuits in accordance with the invention may have a plurality of external input connections to which the input signals are in operation applied individually, or have a single input connection common to all the input signals; in the latter case a unit embodying the invention can be designed to take the place of an electromagnetic uniselector of conventional form.

According to the invention a circuit has a plurality of adding or "AND" circuit stages and a corresponding number of bistable state or "LATCH" circuit stages connected alternately in sequence to provide associated pairs, each "LATCH" stage having in use a normal state in which it is inoperative and a triggered state in which an output connection of that stage provides one of a sequence of output signals, one input for the associated "AND" stage, and a changeover signal for an immediately adjacent "LATCH" stage, additional inputs for the "AND" stages being provided from a connection or connections to which external control signals can be applied and the application of two inputs to one of the "AND" stages producing an output thereof which acts to change over a corresponding one of the "LATCH" stages.

The terms "AND" and "LATCH" as used herein will be readily understood by persons skilled in the art who are accustomed to so-called logic network analysis. In effect the "AND" stages of the invention act to combine two inputs to provide a summated output, and the "LATCH" stages act as switches triggered or changed over to provide output signals and one input for the "AND" stages. References herein to an immediately adjacent "LATCH" stage refer to the next "LATCH" stage in the sequential operation of the circuit and it will be appreciated that this does not necessarily mean physically adjacent.

The circuit may have a number of input connections to which the external control signals can be applied in turn and which correspond to the output signal connections. In this case the output of each "LATCH" stage, when that stage is in the triggered state, conveniently provides a reset signal for the immediately preceding "LATCH" stage with the output of each "AND" stage providing the trigger input of the next following "LATCH" stage.

Alternatively, a common external connection to which all the control signals are applied can be connected to one input of each "AND" stage. In this case the output of each "LATCH" stage conveniently provides the trigger input of the next following "LATCH" stage, and the output of each "AND" stage provides the reset input of the associated "LATCH" stage.

The circuit is preferably partly or entirely electronic in character, and both the "AND" and "LATCH" stages conveniently employ solid-state devices. Each "LATCH" stage conveniently comprises two transistors connected in a "flip-flop" arrangement, and each "AND" stage may employ two semiconductor diodes connected in parallel with separate inputs and a common output.

Alternatively the circuitry may be partly or entirely fluid operated, the "LATCH" stages for example utilizing bistable fluid logic devices such as have recently come into use and are commonly referred to as "induction amplifiers" or "focus jet amplifiers." Such devices can also be utilized to provide the "AND" stages.

The invention will now be further described with reference to the accompanying drawings which show by way of example two circuits constructed in accordance with the invention. In the drawings.

Figure 1:
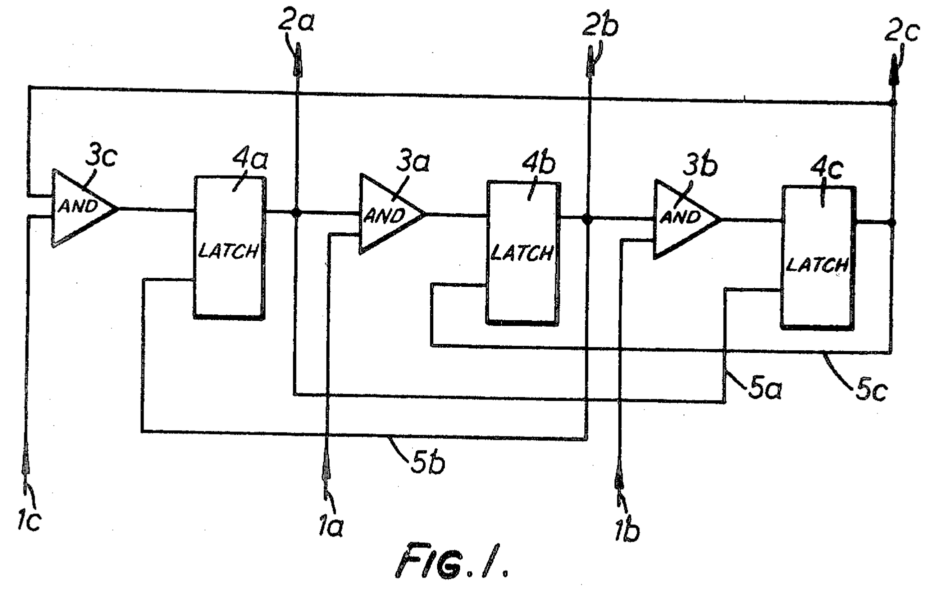
FIG. 1 shows one circuit in logic form.
Figure 2:
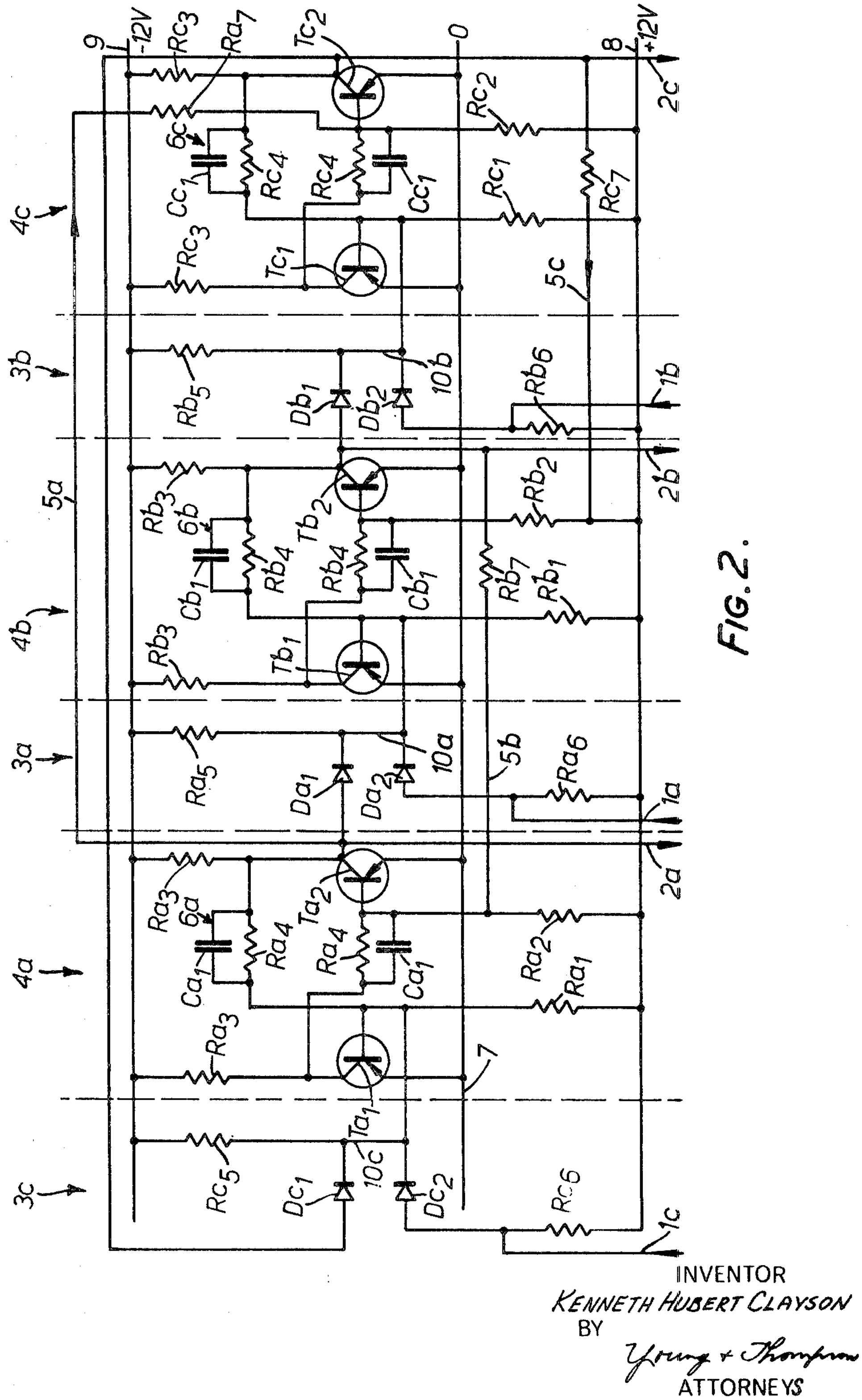
FIG. 2 shows the circuit of FIG. 1 in electronic form.

The circuit of FIGS. 1 and 2 has three input connections 1*a*, 1*b*, 1*c* to which control signals can be applied in turn and the same number of output connections 2*a*, 2*b*, 2*c* at which the sequence of output signals appears during circuit operation. Three "AND" stages 3*a*, 3*b*, 3*c* are provided together with three "LATCH" stages 4*a*, 4*b*, 4*c*, the stages 3 and 4 being connected alternately in series, and each input connection 1*a*, 1*b*, 1*c* providing one input for a corresponding one of the "AND" stages 3*a*, 3*b*, 3*c*. The other input of the stage 3*a*, 3*b*, 3*c* is provided by the output of the immediately preceding "LATCH" stage 4*a*, 4*b*, 4*c* respectively and the output of each "AND" stage 3*a*, 3*b*, 3*c* provides a trigger input for the next following "LATCH" stage 4*b*, 4*c*, 4*a*, respectively. The stages are thus associated in pairs, the two stages of each pair being identified by a common suffix, namely *a*, *b* or *c*.

The output of each 37 LATCH" stage 4*a*, 4*b*, 4*c* provides the output signal at the corresponding output connection 2*a*, 2*b*, *c* and also provides a reset signal via reset line 5*a*, 5*b*, 5*c* for the immediately preceding "LATCH" stage 4*c*, 4*a*, 4*b* respectively. The alternately connected "AND" and "LATCH" stages 3 and 4 can be considered as connected in series in a continuous ring, i.e. the first "AND" stage 3 in the circuit can be considered, from the point of view of circuit operation, as immediately following the last "LATCH" stage 4 of the circuit.

Each "LATCH" stage 4 is bistable and has two states; a normal state in which it is inoperative in the sense that it provides no output and a triggered state in which it provides a signal at the corresponding output connection 2, as well as an input signal for the associated "AND" stage 3 and a reset signal for the preceding "LATCH" stage 4 to change over the latter back to the normal state.

Initially the circuit can be considered with the first "LATCH" stage 4*a*, , connected to the first output connection 2*a*, in the triggered or operative state and the remaining "LATCH" stages 4*b* and 4*c* in the normal state. An input voltage pulse applied to the first input connection 1*a* is added by the corresponding "AND" stage 3*a* to the other input obtained from the triggered "LATCH" stage 4*a*, the result being that the "AND" stage 3*a* provides an output signal which triggers the next "LATCH" stage 4*b*. The "LATCH" stage 4*b* then provides an output signal at the second output connection 2*b*, at the same time providing one input for the next following "AND" stage 3*b* and a reset signal via reset line 5*b* for the previously operative "LATCH" stage 4*a* which is thus returned to the normal state. The circuit continues operating in this manner, the output signals being sequenced along the output connections 2*a*, 2*b*, 2*c* as input pulses are applied to the input connections 1*a*, 1*b*, 1*c* in turn.

Referring to FIG. 2, the circuit employs solid-state devices, each "AND" stage 3*a*, 3*b*, 3*c* having two semiconductor diodes $Da_1$, $Da_2$, $Db_1$, $Db_2$, $Dc_1$, $Dc_2$ and each "LATCH" stage 4*a*, 4*b*, 4*c* utilizes two PNP-type transistors $Ta_1$, $Ta_2$, $Tb_1$, $Tb_2$, $Tc_2$ connected in an Eccles-Jordon-type "flip-flop" circuit 6*a*, 6*b*, 6*a* with a common emitters arrangement, i.e. both emitters connected to a common zero voltage or "earth" line 7. The base of each transistor $Ta_1$, $Ta_2$, $Tb_1$, $Tb_2$, $Tc_1$, $Tc_2$ is connected to a +12 volt DC supply line 8 through a resistor $Ra_1$, $Ra_2$, $Rb_1$, $Rb_2$, $Rc_1$, $Rc_2$ respectively of suitable value, and the collector of each transistor is likewise connected through a suitable resistor $Ra_3$, $Rb_3$, $Rc_3$ to a −12 volt DC supply line 9. The collector of each transistor $Ta_1$, $Ta_2$, $Tb_1$, $Tb_2$, $Tc_1$, $Tc_2$ is also connected to the base of the other transistor through a resistor $Ra_4$, $Rb_4$, $Rc_4$ shunted by a capacitor $Ca_1$, $Cb_1$, $Cc_1$ thus providing a conventional "flip-flop" arrangement.

The base of the first transistor $Ta_1$, $Tb_1$, $Tc_1$, of each "LATCH" stage 4*a*, 4*b*, 4*c* is connected to the common output 10*c*, 10*a*, 10*b* of the two diodes $Dc_1$, $Dc_2$, $Da_1$, $Da_2$, $Db_1$, $Db_2$ respectively of the immediately preceding "AND" stage 3*c*, 3*a*, 3*b*, which is also connected to the −12 volt line 9 through a resistor $Rc_5$, $Ra_5$, $Rb_5$. The input of one diode $Da_2$, $Db_2$, $Dc_2$ of each "AND" stage 3*a*, 3*b*, 3*c* is connected directly to the corresponding circuit input connection 1*a*, 1*b*, 1*c* and also through a resistor $Ra_6$, $Rb_6$, $Rc_6$ to the +12 volt line 8. The input of the other diode $Da_1$, $Db_1$, $Dc_1$ of the stage 3*a*, 3*b*, 3*c* is connected directly to the collector of the second transistor $Ta_2$, $Tb_2$, $Tc_2$ of the preceding "LATCH" stage 4*a*, 4*b*, 4*c*, this collector also being connected directly to the circuit output connection 2*a*, 2*b*, 2*c* corresponding to that stage. The output of each "LATCH" stage 4*a*, 4*b*, 4*c*, which is already described is provided by the collector of the second transistor $Ta_2$, $Tb_2$, $Tc_2$ of that stage, is connected to the base of the second transistor $Tc_2$, $Ta_2$, $Tb_2$ of the immediately preceding "LATCH" stage 4*c*, 4*a*, 4*b* by current limiting resistor $Ra_7$, $Rb_7$, $Rc_7$ connected in the corresponding reset line 5*a*, 5*b*; 5*c*.

One example of use of this circuit is to provide automatic control of a machine for polishing the bumper bars of motor vehicles. In such a machine either the polishing head moves over the bumper, or the bumper moves with the polishing head fixed. In one specific case, the bumper is split into four zones or sections, each of which requires a different closure force between the bumper and polishing head for a satisfactory finish. The closure force required is produced by a pneumatic cylinder in which the air pressure can be varied. During polishing, the circuit described controls the closure pressure by selecting and operating an electropneumatic distributor valve. A series of such valves can be used to apply air at the correct pressure according to the zone being polished.

For each zone there is fitted a detector, comprising a reed switch and magnet with a suitable airgap between the components. The detector is operated by the passage of a magnetic shield in the form of a mild steel strip between the reed switch and magnet. The detectors are fitted to the polishing head, and the simple magnetic shield is fitted to the bumper jig. As the bumper is moved relatively to the polishing head, the magnetic shield actuates the first detector, pulsing the first input of the control circuit. This causes an electropneumatic valve to operate under the control of the circuit, bringing the polishing head into contact with the bumper at the correct closure pressure. On completion of the first zone the shield operates a second detector, thus pulsing the second input of the control circuit and changing the closure pressure to that required for the second zone.

The shield operates third and fourth detectors in a similar manner. When a fifth detector is operated, the polishing head is lifted from the bumper at the completion of polishing, and the sequence control circuit reset ready for the next cycle. If less than four zones are required, a suitable switching can make the redundant sections of the control circuit inoperative.

Figure 3:
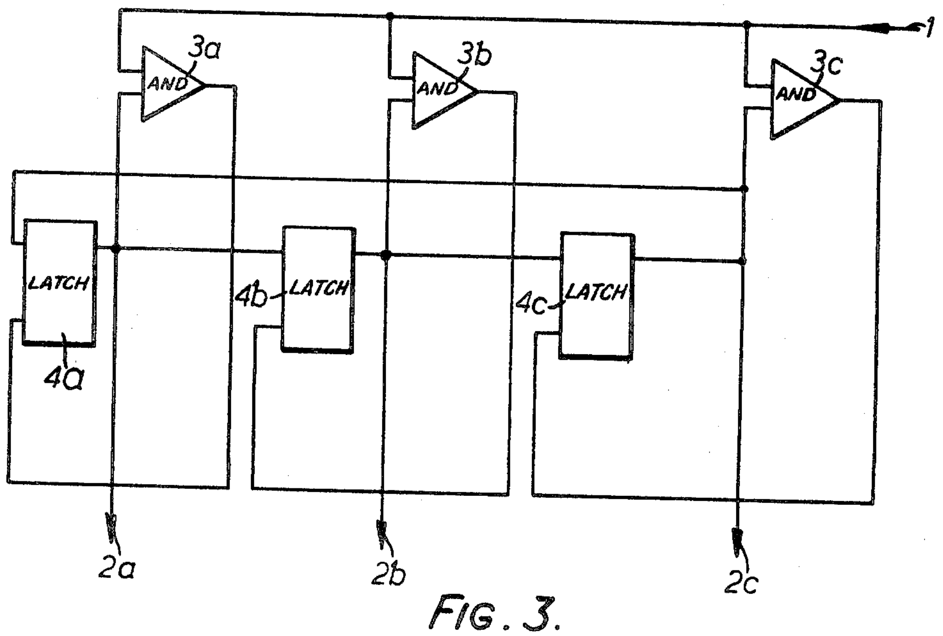
FIG. 3 shows the other circuit in logic form.
Figure 4A:
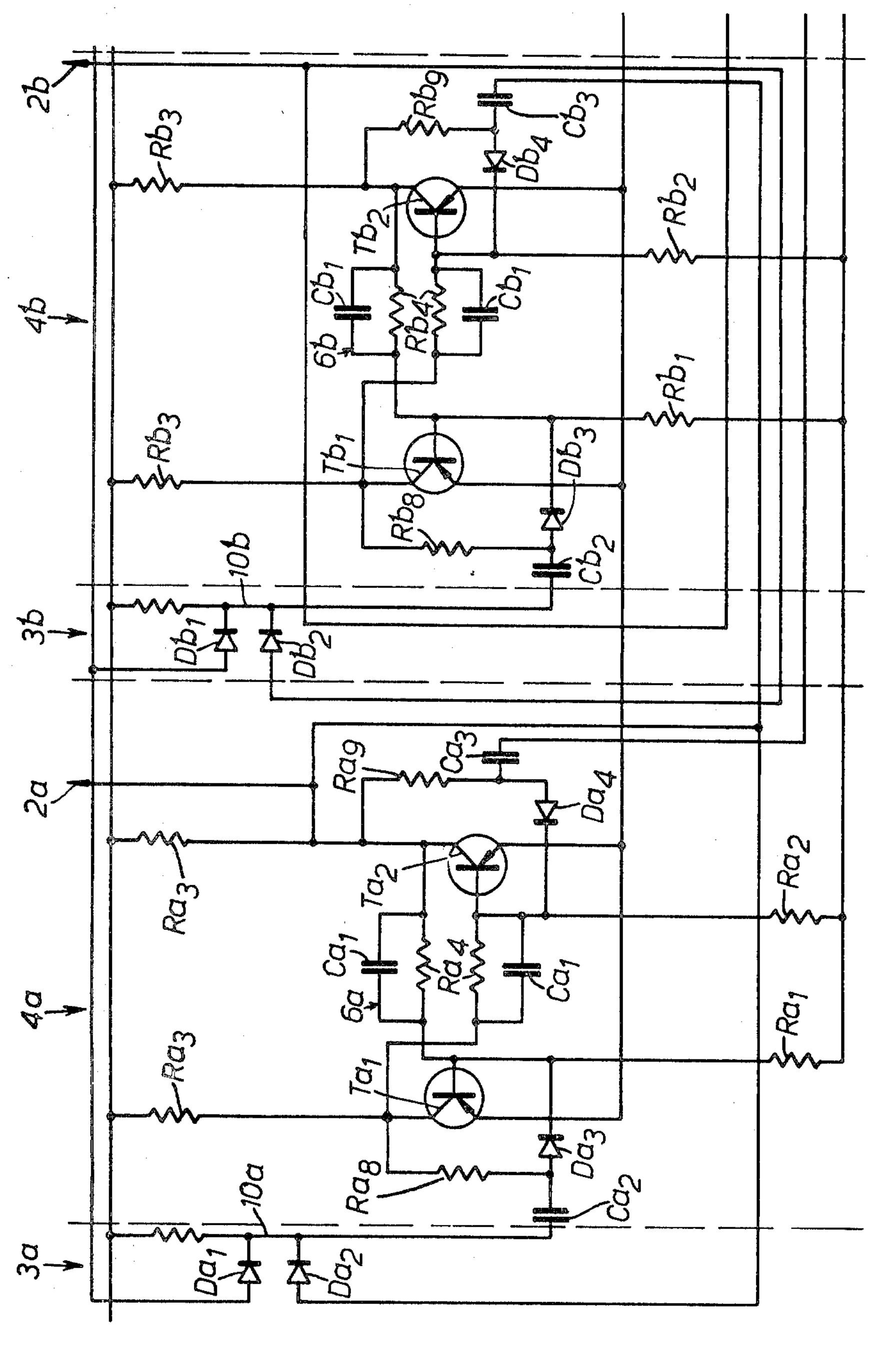
FIG. 4A and 4B show the circuit of FIG. 3 in electronic form.
Figure 4B:
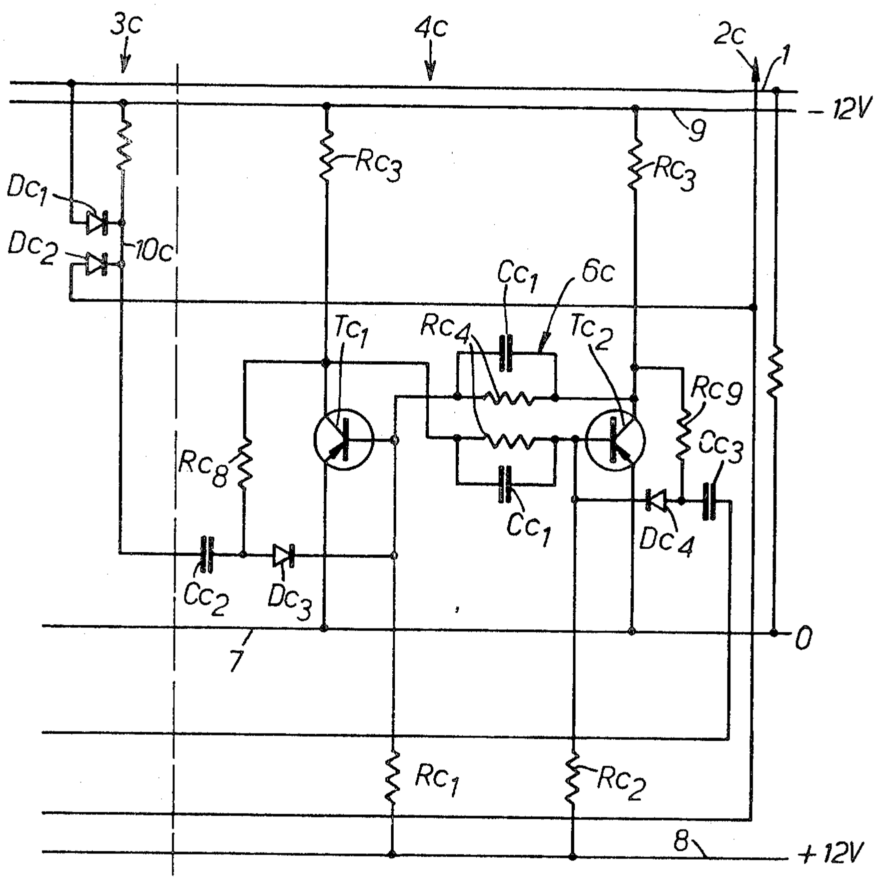

In the other circuit of FIG. 3 and FIGS. 4A and 4B similar components have been given the same reference numerals as in FIGS. 1 and 2. The circuit of FIG. 3 and FIGS. 4A and 4B utilizes a common input connection 1 to which all of the external control pulses are applied in turn, this input connection providing one input of each "AND" stage 3*a*, 3*b*, 3*c*. The only important logic circuit differences are that the output of each "LATCH" stage 4*a*, 4*b*, 4*c*, in addition to providing the corresponding output signal at the output connections 2*a*, 2*b*, *b* 2*c* and the other input for the associated "AND" stage 3*a*, 3*b*, 3*c* also provides the trigger pulse to operate the following "LATCH" stage 4*b*, 4*c*, 4*a*, instead of the reset input for the immediately preceding stage as in the circuit of FIGS. 1 and 2. When the output of each "AND" stage 3*a*, 3*b*, 3*c*, changes from −12 volts to zero this pulse provides the reset input for the associated "LATCH" stage 4*a*, 4*b*, 4*c* and this arrangement provides a unit which can be used as a direct replacement for a conventional electromagnetic uniselector and requires only one signal input connection or stepping lead 1. By applying control pulses to this lead 1 the unit sequences one step per pulse at the separate output connections 2*a*, 2*b*, 2*c*.

Again operation of the circuit can be considered as starting with the first "LATCH" stage 4*a* in the triggered state, the remaining "LATCH" stages 4*b* and 4*c* being in the normal state. A pulse applied to the input connection 1 provides a second input for the first "AND" stage 3*a*, the first input being provided by the output of the first "LATCH"stage 4*a*, and the output of this "AND" stage acts to reset the first "LATCH" stage 4*a* provides a positive going pulse at the trigger input of the second "LATCH" stage 4*b*, triggering the latter to provide an output which appears at the second connection 2*b* of the circuit and also provides one input signal for the second "AND" stage 3*b*. The circuit is now in the second sequence position and ready to accept the next incoming control pulse which will sequence the unit on one more step.

Referring to FIG. 4A and 4B each "AND" stage 3*a*, 3*b*, , 3*c* again utilizes two diodes $Da_1$, $Da_2$, $Db_1$, $Db_2$, $Dc_1$, $Dc_2$ with separate inputs and a common output and each "LATCH" stage 4*a*, 4*b*, 4*c* utilizes two PNP-type transistors $Ta_1$, $Ta_2$, $Tb_1$, $Tb_2$, $Tc_1$, $Tc_2$ connected in a "fip-flop" circuit 6*a*, 6*b*, 6*c* similar to that of the circuit of FIG. 2.

The output 10*a*, 10*b*, 10*c* of each "AND" stage 3*a*, 3*b*, 3*c* is connected to the base of the first transistor $Ta_1$, $Tb_1$, $Tc_1$ of the associated "latch" stage 4*a*, 4*b*, 4*c* through a capacitor $Ca_2$, $Cb_2$, $Cc_2$ and semiconductor diode $Da_3$, $Db_3$, $Dc_3$ connected in series, the connection between the capacitor $Ca_2$, $Cb_2$, $Cc_2$, and diode $Da_3$, $Db_3$, $Dc_3$ being connected to the collector of the first transistor $Ta_1$, $Tb_1$, $Tc_1$ through a resistor $Ra_8$, $Rb_8$, $Rc_8$ and hence to the −12 volt line 9 through the corresponding transistor load resistor $Ra_3$, $Rb_3$, $Rc_3$. The trigger input of each "LATCH" stage 4*a* , 4*b*, 4*c* is also applied through a series capacitor $Ca_3$, $Cb_3$, $Cc_3$ and diode $Da_4$, $Db_4$, $Dc_4$ connected between the output, i.e. the collector of the second transistor $Tc_2$, $Ta_2$, $Tb_2$ of the immediately preceding "LATCH" stage 4*c*, 4*a*, 4*b* and the base of the second transistor $Ta_2$, $Tb_2$, $Tc_2$ of the stage being considered. The connection between the capacitor $Ca_3$, $Cb_3$, $Cc_3$ and diode $Da_4$, $Db_4$, $Dc_4$ is connected to the collector of the second transistor $Ta_2$, $Tb_2$, $Tc_2$ through a resistor $Ra_9$, $Rb_9$, $Rc_9$ and hence to the −12 volt line 9 through the corresponding transistor load resistor $Ra_4$, $Rb_4$, $Rc_4$. Apart from these differences, and a pulse input connection 1 which provides a common input for the corresponding diodes of the "AND" stages 3*a*, 3*b*, 3*c*, the circuit of FIGS. 3 and FIGS. 4A and 4B 4 is generally the same as the circuit of FIGS. 1 and 2.

With the circuit of FIGS. 3 and FIGS. 4A and 4B also, suitable switching can be provided to switch out one or more of the "LATCH" and "AND" combinations which may not be required, thus rendering the corresponding output connection or connections inoperative.

I claim:

1. A sequence control circuit for providing a plurality of sequential output signals on sequence control circuit outputs only in response to a plurality of external control signals applied in turn to a plurality of sequence control circuit inputs comprising alternately positioned "AND" stage means and bistable latch stage means, each said bistable latch stage means having a normal stable state and an operative stable state wherein a latch output signal is provided and being operative to switch from the normal stable state to the operative stable state in response to a change over signal provided thereto by the next preceding "AND" stage means, and individual output means connected to each latch stage means to provide the latch output signal therefrom to a sequence control circuit output, said output means also operating to provide said latch output signal to the next following "AND" stage means and to the said bistable preceding latch stage means, said last preceding latch stage means being reset to the normal stable state by said latch output signal, each said "AND" stage means being connected to receive an external control signal from one of said sequence control signal inputs and operating upon the simultaneous reception of an external control signal and a latch output signal from the next preceding latch stage means to provide a change over signal to the next following latch stage means.